United States Patent

[11] 3,575,093

| [72] | Inventors | William Packard<br>Fair Lawn;<br>George W. Brown, Saddle Brook, N.J. |
|---|---|---|
| [21] | Appl. No. | 765,331 |
| [22] | Filed | Oct. 7, 1968 |
| [45] | Patented | Apr. 13, 1971 |
| [73] | Assignee | The Bendix Corporation |

[54] STABLE PLATFORM HAVING MEANS FOR REDUCING GYROSCOPE CONSTANT BIAS ERRORS
16 Claims, 3 Drawing Figs.

| [52] | U.S. Cl. | 74/5.34, 74/5.41 |
|---|---|---|
| [51] | Int. Cl. | G01c 19/30 |
| [50] | Field of Search | 74/5.34, 5.22, 5.41; 244/79 |

[56] References Cited
UNITED STATES PATENTS

| 1,735,058 | 11/1929 | Schuler | 74/5.34 |
|---|---|---|---|
| 2,566,305 | 9/1951 | Beacom | 74/5.34X |
| 2,898,766 | 8/1959 | Pittman | 74/5.34 |
| 3,004,437 | 10/1961 | Pittman | 74/5.34 |
| 3,020,537 | 2/1962 | Schriefer | 74/5.34X |
| 3,192,778 | 7/1965 | Ephgrave | 74/5.34 |
| 3,335,614 | 8/1967 | Ellis | 74/5.34 |

*Primary Examiner*—Manuel A. Antonakas
*Attorneys*—S. H. Hartz and Plante and Arens, Hartz, Smith & Thompson ABSTRACT: A stable platform controlled about two axes and having a pair of single-degree-of-freedom gyroscopes rotatably mounted with their spin axes parallel and their input axes mutually perpendicular and forming a plane parallel with the platform controlled axes. The gyroscopes are rotated about an axis parallel to their spin axes and provide signals corresponding to their respective attitudes. A signal resolver responsive to gyro rotation resolves the gyro attitude signals into signals corresponding to the stable platform attitude for controlling the stable platform. Initial position sensors provide signals corresponding to the error in the initial attitude of the stable platform relative to a predetermined attitude. A torque command resolver, also responsive to gyro rotation, resolves the initial error signals into signals corresponding to gyroscope attitude for initial erection of the gyroscopes and the stable platform to the predetermined attitude.

INVENTORS
WILLIAM PACKARD
GEORGE W. BROWN

STABLE PLATFORM HAVING MEANS FOR REDUCING GYROSCOPE CONSTANT BIAS ERRORS

BACKGROUND OF THE INVENTION

1. Field of the Invention

This invention relates to a stable platform gyroscopically controlled about two axes and, more particularly, to such a platform having means for reducing gyroscope constant bias errors.

2. Description of the Prior Art

Heretofore reduction of gyroscope constant bias errors was limited by the quality of gyroscopes available. Even with the finest quality gyroscopes it was necessary to compensate for these errors. There were three basic methods of compensation.

Firstly, D. L. Freebairn et al. U.S. Pat. No. 2,999,391 attempted to overcome these errors by periodically reversing rotor rotation causing the errors to oppose and cancel one another. Because of the reversal in direction of rotor rotation an additional gyroscope was needed to control the platform while the other gyro was being reversed. Extensive precision equipment was also required because the periods of rotation in each direction must be equal and reversal of rotor rotation was difficult to achieve.

Secondly, J. T. Ephgrave, U.S. Pat. No. 3,192,778 utilized a device where a second gyroscope was used to detect the drift or constant bias errors in the gyroscope and then torque elements repositioned the gyroscope to its proper alignment. With this arrangement the compensation accuracy was subject to the errors of the second gyroscope.

Thirdly, S. M. Ellis, U.S. Pat. No. 3,335,614 teaches that manufacturing inaccuracies in a two-degree-of-freedom vertical gyroscope can be eliminated by continuous rotation of the gyro case about the vertical axis. While the Ellis patent recognizes the value of case rotation in reducing constant bias errors it only teaches the implementation of the technique in a device using a two-degree-of-freedom gyroscope.

SUMMARY OF THE INVENTION

The present invention contemplates a stabilizing apparatus having two single-degree-of-freedom gyroscopes providing signals corresponding to their attitudes. The gyros are mounted on a rotatable gimbal with their input axes mutually perpendicular and their spin axes parallel with a gimbal rotational axis. The gimbal is rotated about its rotational axis thereby reducing gyro constant bias errors.

A stable platform rotatable about two controlled axes is controlled by the stabilizing apparatus, the apparatus being mounted to the platform with the gimbal rotational axis mutually perpendicular to the controlled axes of the platform. The stable platform also has positioning means and initial position sensors providing signals corresponding to the error in the initial attitude of the stable platform from a predetermined attitude.

A gyro signal resolver responsive to the relative position of the gimbal to the stable platform resolves the gyro attitude signals into signals corresponding to stable platform attitude to control the platform positioning means.

A torque command resolver also responsive to the relative position of the gimbal to the stable platform resolves the platform initial error signals from the initial position sensors into gyroscope attitude signals for proper erection of the gyroscopes and the stable platform.

One object of the invention is to provide a stabilizing apparatus having two single-degree-of-freedom gyroscopes rotated about an axis parallel to their spin axes to eliminate constant bias errors.

Another object of the invention is to utilize the stabilizing apparatus to control a stable platform.

Another object is to resolve electrical signals corresponding to gyro attitude into signals corresponding to stable platform attitude.

Another object of the invention is to resolve initial position signals corresponding to the stable platform attitude error into rotating gyro attitude signals for the required initial erection of the gyroscopes and stable platform.

Another object of the invention is to facilitate parallel alignment of the gyro spin axes and the rotational axis.

The foregoing and other objects and advantages of the invention will appear more fully hereinafter from a consideration of the detailed description which follows, taken together with the accompanying drawings wherein one embodiment of the invention is illustrated by way of example.

DESCRIPTION OF THE DRAWINGS

In the drawings in which corresponding numerals indicate corresponding parts in their respective figures.

DESCRIPTION OF THE INVENTION

Figure 1:
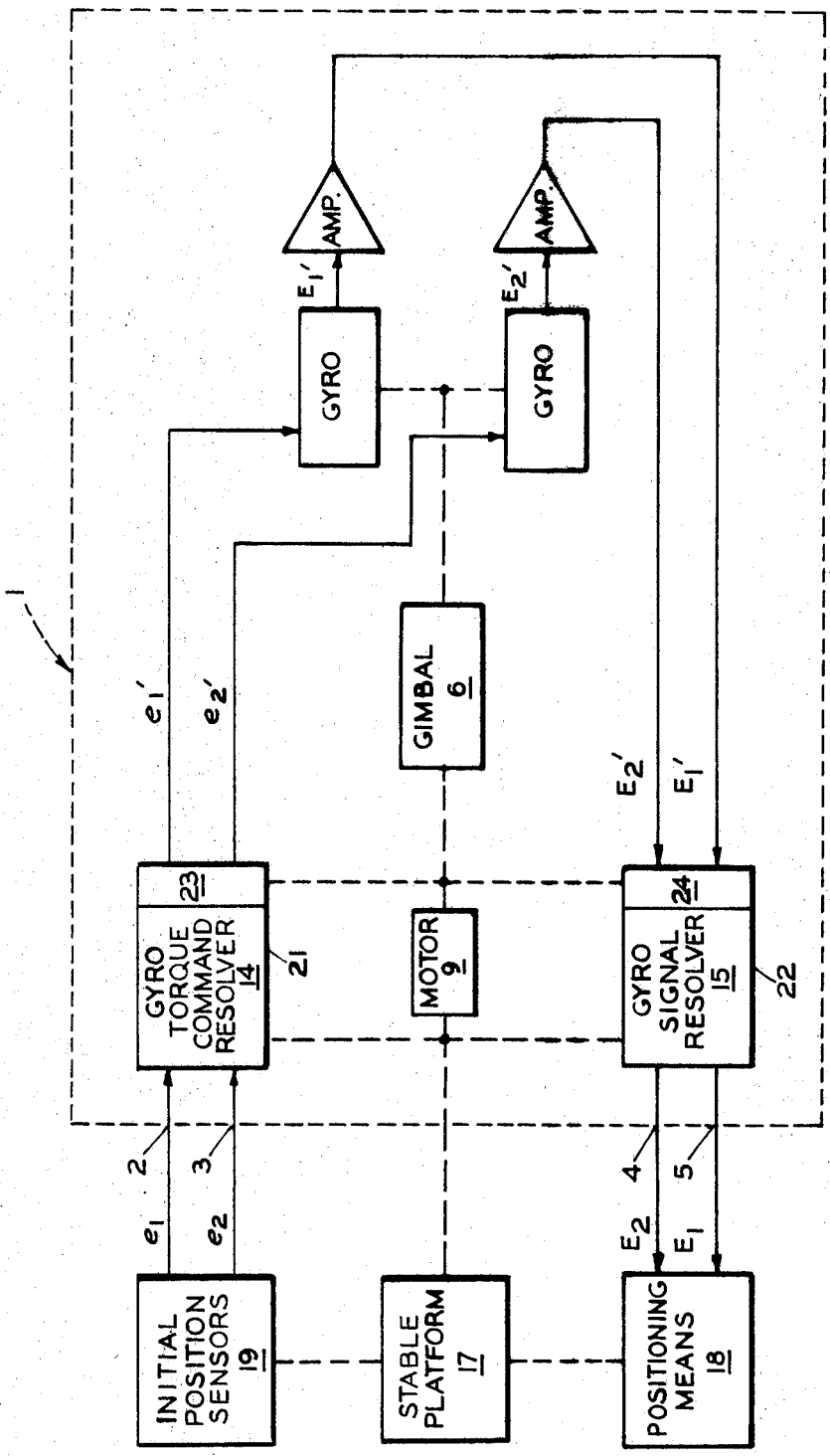
FIG. 1 is a block diagram of a stable platform controlled by a stabilizing apparatus constructed according to the present invention.
Figure 2:
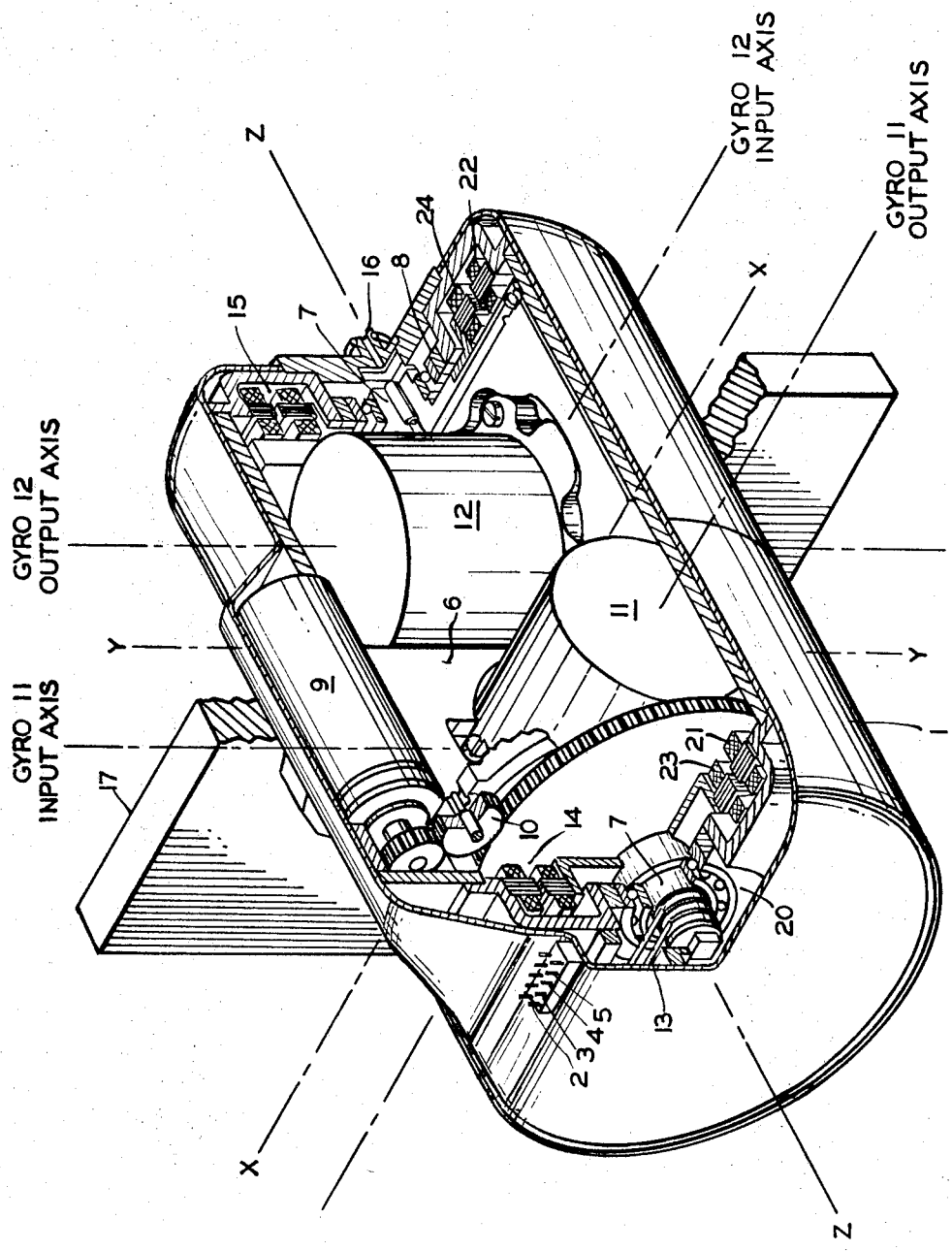
FIG. 2 is a perspective view of the stabilizing apparatus constructed according to the invention with a portion of the housing being cut away.

Referring to FIGS. 1 and 2 there is shown a stable platform 17 controllable about two axes X and Y and having positioning means 18 and initial position sensors 19 attached thereto. Initial position sensors 19 provide signals $e_1$ and $e_2$ corresponding to the error in the initial attitude of the stable platform 17. Positioning means 18, for control of the stable platform are responsive to signals $E_1$ and $E_2$ from a stabilizing apparatus 1 also mounted to the stable platform.

The stabilizing apparatus has two single-degree-of-freedom gyroscopes 11, 12, having signal means and torquer means, mounted on a gimbal 6, rotatable about a rotational axis Z–Z, such that their input axes are mutually perpendicular and their spin axes are parallel to axis Z–Z and perpendicular to the controlled axes X and Y. Gimbal 6 is supported by trunnions 7 and aligned along axis Z–Z by an adjustment of an eccentric bushing 8 which in conjunction with a conventional bushing 20 rotatably secures trunnion 7. A drive motor 9 fixedly mounted to apparatus 1 rotates gimbals 6 through a gear train 10.

Mounted within trunnion 7 and along the rotational axis Z–Z is a gas inlet 16 for supplying gas to fluid pressure bearings if used in the gyroscopes. Two buffer amplifiers 25 are mounted on the gimbal 6. A slip ring assembly 13 mounted on the trunnions 7 conducts excitation to the gyroscopes 11, 12 and buffer amplifiers 25.

Two resolvers 14, 15 having stators 21, 22 and rotors 23, 24 are mounted within the apparatus 1, the stators 21, 22 being fixed to apparatus 1 and the rotors 23, 24 being fixed to gimbal 6. Signals $e_1$ and $e_2$ are connected to the gyro torque command resolver 14 through terminals 2 and 3 mounted on apparatus 1. Gyro torque command resolver 14 responsive to gimbal 6 rotation resolves signals $e_1$ and $e_2$ into signals $e'_1$ and $e'_2$ corresponding to gyroscope attitude which appear on rotor 23 which is connected to the torquer means of gyroscope 11, 12. The outputs of the gyroscopes 11, 12 are connected to buffer amplifiers 25 and then the outputs of the amplifiers are connected to gyro signal resolver 15. The buffer amplifiers are used to reduce the loading effect on the gyro signal means caused by the gyro signal resolver. Gyro signal resolver 15 being responsive to gimbal 6 rotation transforms output signals $E'_1$ and $E'_2$ to signals $E_1$ and $E_2$ corresponding to the stable platform attitude.

OPERATION OF THE INVENTION

Gyroscope constant bias errors, those not dependent upon time or degree of displacement, are cumulative and over a period of time amount to considerable error in the positioning of a stable platform. However, if the gyroscope is inverted the constant bias error will cause the stable platform to drift in the opposite sense. Taking advantage of this principle the gyroscopes in the present invention are slowly rotated so that these errors become cyclic nearly averaging zero for each revolution. The rotation of the gyroscopes must be slow enough so as not to introduce additional errors and fast enough so that the constant bias errors remain constant during each revolution.

Upon initial application of power to the stable platform 17 the gyroscope rotors seek an inertial position and the drive motor 9 slowly rotates gimbal 6 about rotational axis Z-Z. The initial position sensors 19 generate signals $e_1$ and $e_2$ corresponding to the error in the required initial attitude of the stable platform 17. Gyro torque command resolver 14 responsive to gimbal 6 rotation resolves signals $e_1$ and $e_2$ into signals $e'_1$ and $e'_2$ corresponding to gyroscope attitude in accordance with the equations:

$$e'_1 = \cos\theta e_1 + \sin\theta e_2 \quad (1)$$

$$e'_2 = \cos\theta e_2 - \sin\theta e_1 \quad (2)$$

Figure 3:
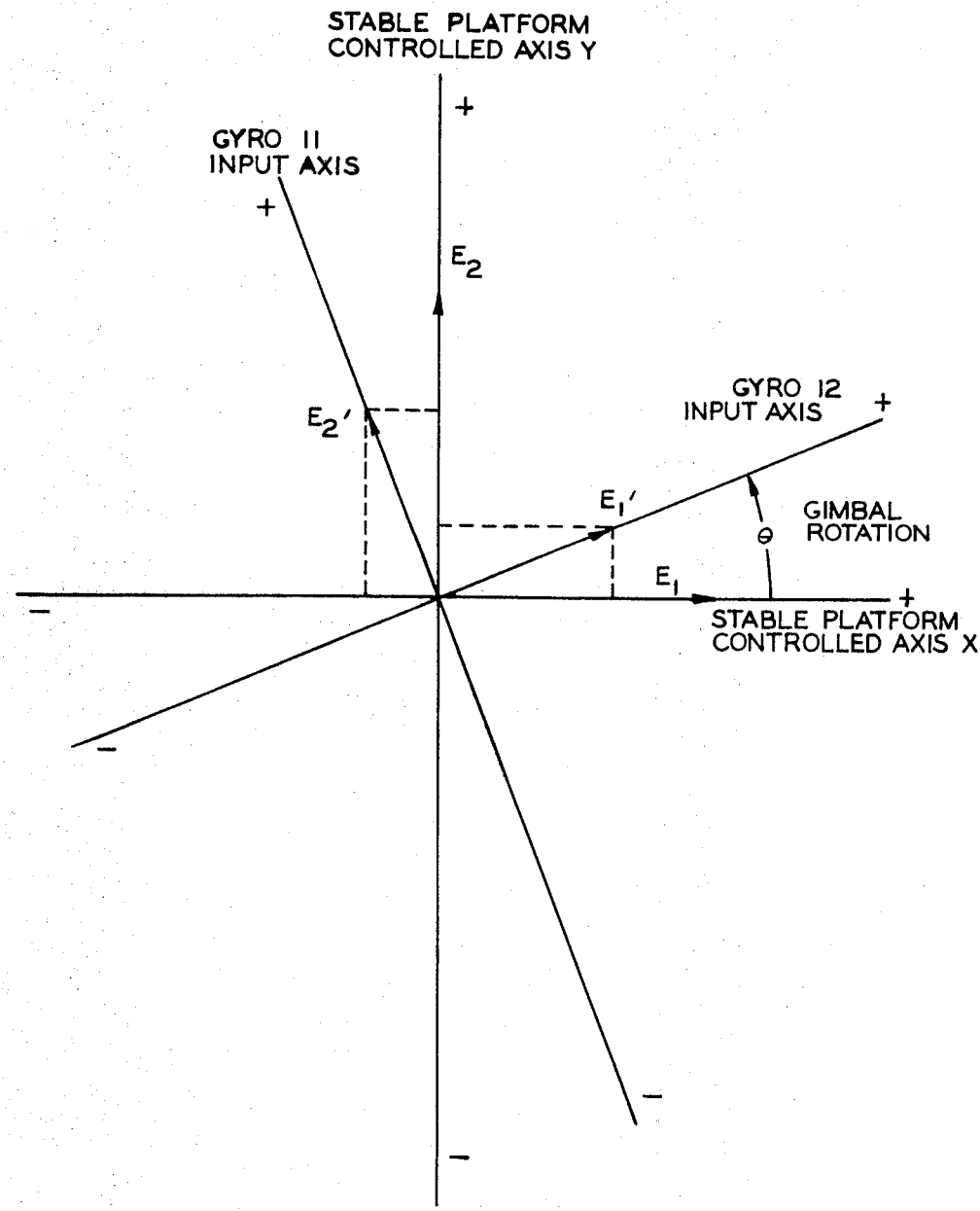
FIG. 3 shows the relationship between the gyro case coordinates and the stable platform coordinates.

$\theta$ being the instantaneous angle between gyro 12 input axis and controlled axis X of the stable platform 17. Signals $e'_1$ and $e'_2$ are applied to the gyro-torquing means and are used to torque the gyro rotors into the proper inertial attitude. Gyro signal resolver 15 which is responsive to gimbal 6 rotation resolves signals $E'_1$ and $E'_2$ into signals $E_1$ and $E_2$ corresponding to stable platform attitude in accordance with the equations:

$$E_1 = \cos\theta E'_1 - \sin\theta E'_2 \quad (3)$$

$$E_2 = \sin\theta E'_1 + \cos\theta E'_2 \quad (4)$$

as shown in FIG. 3. Signals $E_1$ and $E_2$ are used to control the positioning means 18 which positions the stable platform 17 in accordance with the proper initial conditions.

After initial positioning of the stable platform 17 and erection of the gyros the initial position sensors 19 are disconnected from gyroscopes 11, 12 and the gyrorotors remain in the initial inertial position.

Gyroscope output signals $E'_1$ and $E'_2$ corresponding to the deviation between the position of the rotors and gyroscope cases are resolved into signals $E_1$ and $E_2$ corresponding to the deviation between the position of the rotors and the stable platform. Signals $E_1$ and $E_2$ are used to control the positioning means 18 and maintain alignment of the stable platform 17 with the proper initial inertial position.

The resolvers 14, 15 being responsive to gimbal 6 rotation continuously resolve the gyro output signals $E'_1$ and $E'_2$ into meaningful components corresponding to the proper control axes of the stable platform 17 and then sum the components to form signals $E_1$ and $E_2$ used by the positioning means 18 to reposition the stable platform while the gimbal is rotated.

We claim:

1. Stabilizing apparatus comprising:
   a pair of single-degree-of-freedom gyroscopes having means for providing signals corresponding to their attitudes;
   means for mounting the gyroscopes with their spin axes parallel and their input axes mutually perpendicular, said means being rotatable about an axis parallel to the spin axes; and
   means associated with the mounting means for rotating the mounting means, whereby the gyroscopes are rotated causing gyro constant bias errors to become cyclic and nearly average zero.

2. Stabilizing apparatus, as described in claim 1, in which the gyroscope spin axes and the rotation axis of the mounting means are aligned.

3. A stable platform rotatable about two mutually perpendicular controlled axes having a stabilizing apparatus comprising:
   a pair of single-degree-of-freedom gyroscopes having means for providing signals corresponding to their attitudes;
   means for mounting the gyroscopes with their spin axes parallel and their input axes mutually perpendicular, the spin axes being perpendicular to a plane formed by the controlled axes said means being rotatable about an axis parallel to the spin axes; and
   means associated with the mounting means for rotating the mounting means whereby the gyroscopes are rotated causing gyro constant bias errors to become cyclic and nearly average zero.

4. A stable platform as described in claim 3 including:
   signal resolving means connected to the gyroscope signal means and responsive to the relative positions of the gyroscopes and stable platform to resolve the gyroscope attitude signals into signals corresponding to stable platform attitude; and
   positioning means connected to and responsive to the last mentioned signals for rotating the platform about its controlled axes.

5. A stable platform as described in claim 4, in which the signal resolving means comprises a resolver having a rotor element and a stator element, one of the elements being fixed to the stable platform and the other element being rotatable with the mounting means.

6. A stable platform as defined in claim 4, additionally comprising:
   initial position sensors connected to the stable platform and providing signals corresponding to the error in the initial attitude of the stable platform from a predetermined attitude; and
   torque command-resolving means connected to the initial position sensors and responsive to the relative positions of the gyroscopes and stable platform to resolve the stable platform attitude error signals into signals corresponding to the error in the initial gyroscope attitude for erecting the gyroscopes and the stable platform to the predetermined attitude.

7. A stable platform as described in claim 6, in which:
   the signal-resolving means and the torque command-resolving means each have a stator element and a rotor element;
   one element of each resolving means being fixedly mounted to the stable platform; and
   the other element of each resolving means being rotatable with the mounting means.

8. A stable platform as defined in claim 6, in which the pair of single-degree-of-freedom gyroscopes have their spin axes aligned along the rotation axis of the mounting means.

9. Apparatus of the kind described comprising:
   a stable platform mounted for rotation about two mutually perpendicular controlled axes;
   positioning means drivably connected to the stable platform for rotating the stable platform about said axes;
   a gimbal mounted on the stable platform for rotation about an axis orthogonal to the controlled axes;
   a pair of single-degree-of-freedom gyroscopes mounted on the gimbal with their spin axes parallel with the gimbal rotation axis and their input axes mutually perpendicular and having means for providing signals corresponding to their attitudes;
   a motor drivably connected to the gimbal for rotating the gimbal about its rotation axis to reduce gyroscope constant bias errors; and
   signal-resolving means connected to the gyroscope signal means and responsive to the relative positions of the gyroscopes and the stable platform to resolve the gyroscope attitude signals into signals corresponding to the stable platform attitude to control the positioning means and maintain the stable platform in a predetermined attitude.

10. A stable platform as defined in claim 9, additionally comprising:

initial position sensors connected to the stable platform and providing signals corresponding to the error in the initial attitude of the stable platform relative to a predetermined attitude; and torque command-resolving means connected to the initial position sensors and responsive to the relative positions of the gyroscopes and the stable platform to resolve the stable platform attitude error signals into signals corresponding to the errors in the initial attitude of the gyroscopes for initial erection of the gyroscopes and stable platform to the predetermined attitude.

11. A stable platform as defined in claim 10, in which the gyroscopes have erecting means responsive to the gyroscope attitude error signals for erecting the gyroscopes so that their spin axes are parallel.

12. A stable platform as defined in claim 9, in which the signal-resolving means provides electrical signals and comprises a resolver having:

a stator element and a rotor element, one of the elements being fixedly mounted to the stable platform and being electrically connected to the positioning means; and the other element being fixedly mounted to the gimbal and being electrically connected to the signal means.

13. A stable platform as defined in claim 10, in which:

the signal-resolving means and the torque command-resolving means provide electrical signal and each have a stator element and a rotor element;

one element of each resolving means being fixedly mounted to the stable platform, said one element of the signal-resolving means being electrically connected to the positioning means and the said one element of the torque command-resolving means being electrically connected to the initial position sensors; and the other element of each resolving means being fixedly mounted to the gimbal and being electrically connected to the gyroscopes.

14. A stable platform as defined in claim 9, additionally comprising eccentric bushing means between the stable platform and the gimbal for aligning the gimbal rotation axis orthogonal to the controlled axes of the stable platform.

15. A stable platform as defined in claim 9, additionally comprising buffer amplifiers connecting the gyroscope signal means to the signal resolving means for reducing the loading effects of the resolving means on the gyroscopes.

16. A stable platform as defined in claim 12, additionally comprising buffer amplifiers connecting the gyroscope signal means to the one element of the resolving means fixedly mounted to the gimbal.